Figures 2, 8:
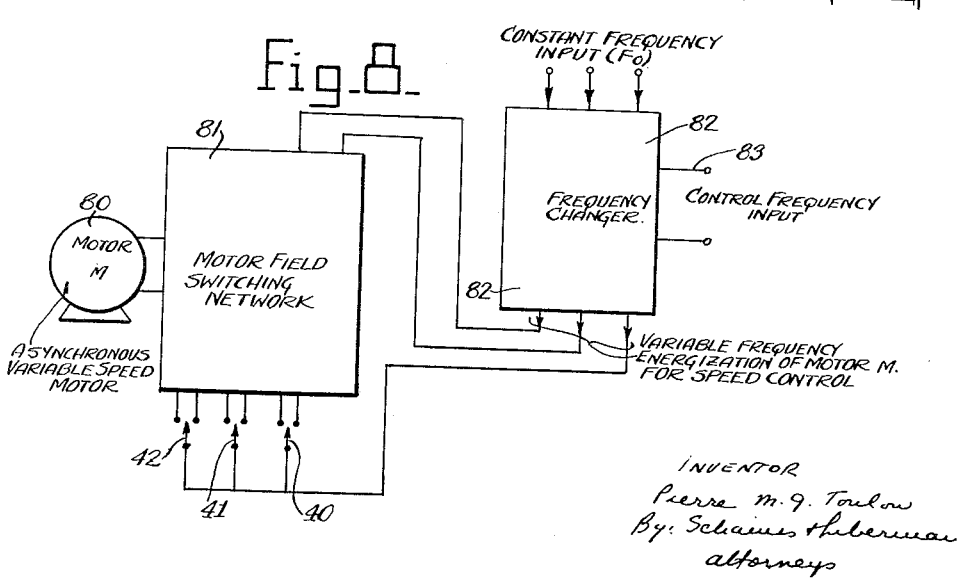

| | 1 | √3 | 2 | 3 | 2√3 | 3√3 | 6 | 6√3 |
|---|---|---|---|---|---|---|---|---|
| I | − | − | + | − | + | − | + | + |
| II | − | − | − | + | − | + | + | + |
| III | − | + | − | − | + | + | − | + |
| | 1 | 1,73 | 2 | 3 | 3,4 | 5,2 | 6 | 10,38 |

July 19, 1955

P. M. G. TOULON 2,713,657

VARIABLE SPEED MOTORS CONTROLLED BY ELECTRONIC TUBES

Filed Oct. 4, 1950

5 Sheets-Sheet 5

INVENTOR
Pierre M. G. Toulon
By: Schaines & Lieberman
attorneys

United States Patent Office 2,713,657
Patented July 19, 1955

2,713,657

VARIABLE SPEED MOTORS CONTROLLED BY ELECTRONIC TUBES

Pierre Marie Gabriel Toulon, New York, N. Y., assignor, by direct and mesne assignments, of seventy-five per cent to Products and Licensing Corporation, New York, N. Y., a corporation of Delaware, and twenty-five per cent to Nelson Moore and William D. Hall, joint tenants Application October 4, 1950, Serial No. 188,297

13 Claims. (Cl. 318—225)

The present invention relates to a new process for feeding variable speed electric motors with A. C. having constant amplitude of voltage, and is especially concerned with the control of squirrel-cage induction motors. It is particularly applicable to systems in which electronic tubes, such as gas filled, grid-controlled tubes, are used to feed the windings of asynchronous electric motors.

An object of the present invention resides in the provision of a system for varying motor speed, in which system the windings of an asynchronous motor are fed with an alternating current of variable frequency. This variable frequency may in turn be obtained from an external electrical network having an output constant frequency, through a frequency converted. Preferably, the said variable frequency is obtained without moving parts, through the means of ionic tubes.

According to one form of this invention, all frequencies utilized in effecting motor control, from the lowest frequencies, for example that of five cycles per second, to the frequency of the said external network, say fifty cycles per second, are effected by connecting each of the phases of the constant frequency network with each of the phases of a variable frequency output network with the help respectively of two tubes connected in reverse directions. These two tubes are locked and unlocked periodically and alternatively, according to the desired frequency output. The current passes alternately through each of the tubes, in a certain cadence, under the control of the tube grids. These grids are in turn negatively biased or driven positive, by means of an energizing system that I designate a "master control." The variation in control frequency of this master control thus permits the generation of a very large number of frequencies, namely all frequencies between zero and the frequency of the external feeding network.

In trying to utilize variable frequency output current to feed a motor with alternating current, as described above, a major problem is found to be present. The variable frequency voltage produced by the above described tubes is of constant amplitude, while the apparent impedance of the motor decreases very rapidly with the frequency of energy applied thereto. To operate at the maximum induction acceptable in the magnetic core of the motor, and with reasonable current values, it is necessary to reduce the applied voltage for a given coil, in proportion to the frequency.

Another object of the present invention is, accordingly, the provision of a new process of selectively interconnecting the windings of asynchronous motors so as to take into account the changing impedance characteristics of an asynchronous motor energized from a variable frequency source as described above. The new process consists in modifying the apparent impedance of the electric motor, for instance that of a squirrel cage asynchronous motor, in accordance with the frequency furnished by a static frequency converter feeding this motor. The new process of my invention also permits one to modify both the magnitude and frequency of the potentials applied to the various coils of the motor.

A further purpose of the present invention resides in the provision of a motor energization system wherein, the electrical connections between the independent windings of the motor may be varied without any spark or arc occurring. This result is preferably obtained by the use in combination of contactors and ionic tubes. Preferably, the current to the contactor is cut off prior to the separation of the plates of the contactor, and the said current is reestablished only after the contactor is closed, due to a controlling action of the said ionic tubes.

According to the invention, the coils of the stator of the squirrel cage motor are divided into a predetermined number of independent winding portions. These independent windings, which have the same electrical characteristics, can be grouped at will either in series, in parallel, or in parallel series. Any given interconnection of windings to effect a given relative apparent impedance between the motor stator and motor armature will be referred to, in the following description and appended claims, as the "transformation ratio" of the motor at that time.

The invention is also characterized by the use of remote controlled electrically driven contactors, connected with these various coils. The said contactors progressively modify the electric connections of the several independent winding portions in response to the increasing of frequency of energy supplied to those windings, in such a manner as to adapt the impedance characteristics of the motor to that of the frequency used.

The variably connected motor windings are in turn energized by a source of variable frequency alternating current, which source preferably comprises a network of grid controlled ionic tubes, as will be described. The variation in frequency is made through a periodical control of a gas-tube circuit.

The control is effected by a master control which may be either mechanical or electrical. Preferably, this master control, or commutator, includes a certain number of contacts coupled to the control grids of the various tubes, to modify the coil connections. These contacts change alternately the potential applied to the different grids. The commutators are preferably mechanically driven with the help of a small electric motor whose speed can be varied. In accordance with this control motor speed, the cadence of closing and opening of the contacts is varied, and thereby, the cadence of conduction or non-conduction of the ionic tubes is controlled.

According to another embodiment of the invention, the master control may comprise a number of electronic tubes connected with each other to make a polyphased variable frequency oscillator. Preferably, a relaxator is used whose output frequency can be modified at will.

The invention applies particularly to the driving, at a variable speed, of a triphase-motor having six poles, whose no-load speed is 1000 R. P. M. when it is fed at fifty cycles/second, such a motor having six coils per phase. The feeding circuit for such a motor, for instance, is such that the motor coils are connected in parallel to the feeding network, when high speed operation is desired. Again, the motor coils are connected in series when low speed operation is desired. At average speed, the motor coils are connected in parallel series, either by three parallel groups of two series connected coils, or two parallel groups of three series connected coils.

Consequently, since the feeding network is triphased, it is possible to realize in each case a circuit connection in star or delta of the three phases. With this disposition, eight different interconnections of the six coils corresponding to the ratios of transformation 1, $\sqrt{3}$, 2, 3, ond phase, and two tubes 53 and 53', on the third phase, of the two networks 43—44.

Figure 3:
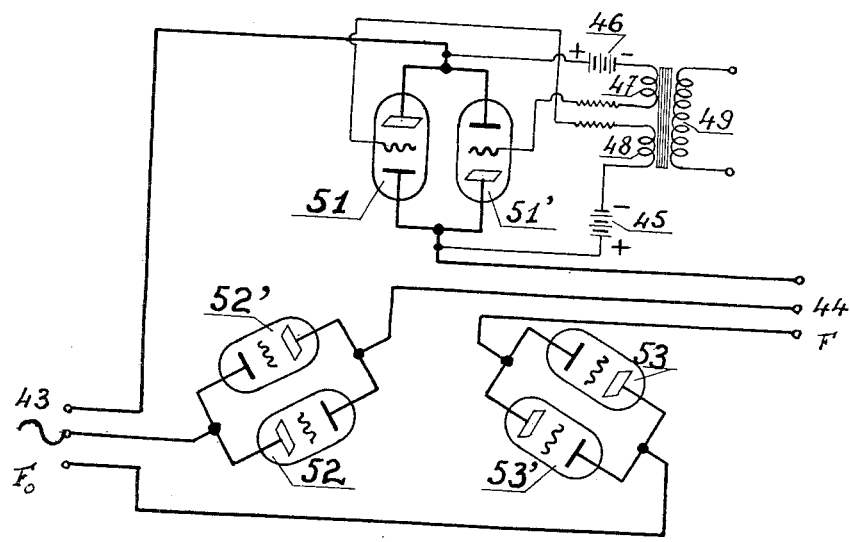

The grids of each group of two tubes are driven alternately at the desired frequency; at each instant only one or the other of the two tubes disposed in the reverse dirctions is conductive. This alternate conduction is controlled by an auxiliary distribution, heretofore referred to as the master control. On Figure 3, we have shown, in 49 only one of the phases of this master control actuating the tubes.

The master control comprises the primary 49 of a transformer having two secondary windings arranged in reverse direction, 47 and 48, which control the grids of the tubes 51 and 51'. The distributions of current that control the grids of the other phase are not shown. Their disposition is the same. The coil 47 is connected in series with a battery 46 to the grid of one of the ionic tubes, such as 51'. The other coil 48 is connected in the same way, in series with a battery 45 to the grid of the other tube 51. The transmission of a control alternating current to the primary 49 opens alternately one or the other of the tubes.

To vary the frequency in the output, we vary, according to the invention, the frequency of signals applied to primary winding 49, for instance, in the control circuits. The latter control potentials are of relatively low power, in the order of a few milliamperes and about 10 volts. On the other hand, the currents obtained through the ionic tubes are very high, for example some hundred amperes, and the output potentials are also relatively high, for example several hundred volts. The change of frequency of the signals arriving from the master control is very easily accomplished and is obtained by the use of very simple means. Its end result is to change the frequency in the output of the network.

Figure 7:
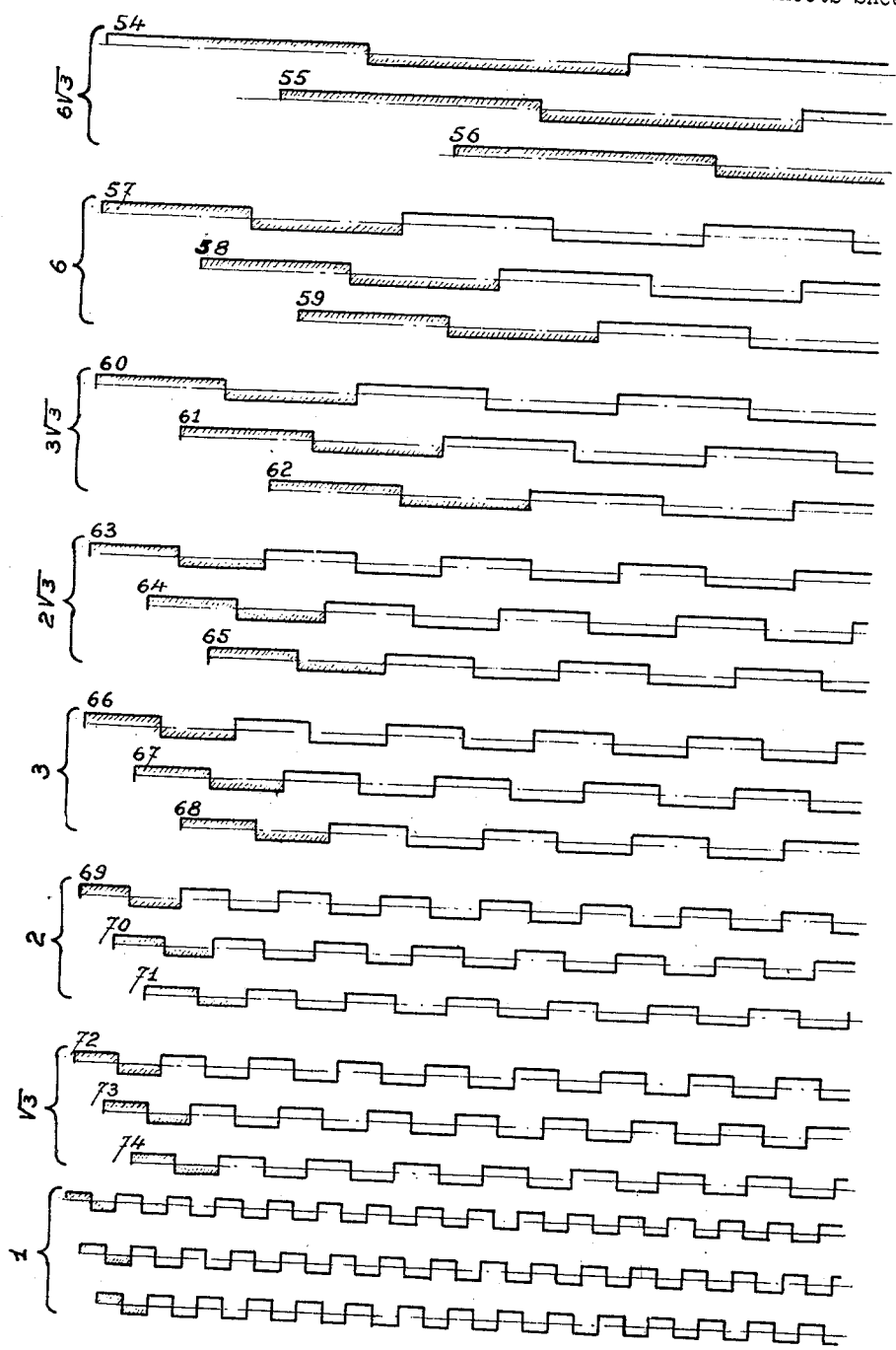

The action of the device is easily explained by referring to Figure 7, which represents as a function of time, the current in the control distributions (such as winding 49). I have shown on the first three lines of this figure, at 54, 55, 56, the form of the control current, when the frequency we want to obtain on the network 44 is, about, $$\frac{50}{6\sqrt{3}} = 5 \text{ cycles per second}$$

The first of these curves in each of the groups of Figure 7 corresponds to the current which feeds the primary 49 of the transformer when a particular frequency output is desired.

I have shown likewise at 57, 58, 59, the form of the driving current when the desired frequency in the circuit is $$\frac{50}{6} = 6.3 \text{ cycles per second}$$

I have shown in waveforms 60, 61, 62, the form of the driving current when the desired frequency is $$\frac{50}{3\sqrt{3}} = 10 \text{ cycles per second}$$

I have shown in waveforms 63, 64, 65, the form of the current when the desired frequency 44 is of $$\frac{50}{2\sqrt{3}} = 14.7 \text{ cycles per second}$$

I have shown in waveforms 66, 67, 68, the form of the driving current when the frequency we want to obtain on the network is $$\frac{50}{3} \text{ or } 16.6 \text{ cycles per second}$$

I have shown in waveforms 69, 70, 71, the form of the driving current when the desired frequency is 25 cycles per second.

Finally, I have shown in waveforms 72, 73, 74, the form of the driving current when the desired frequency is $$\frac{50}{\sqrt{3}}, \text{ about 29 cycles per second}$$

The action of these driving or control currents on the grids of the different tubes has the effect of releasing the periodic currents to the different phases of the output at a variable frequency.

When only six tubes are used, the waveform of the current in each phase of the output circuit is quite poor and relatively large parisitic waves appear. Instead of using a six tube circuit, we can therefore advantageously use a nine tube circuit, as is shown in Figure 4.

Figure 4:
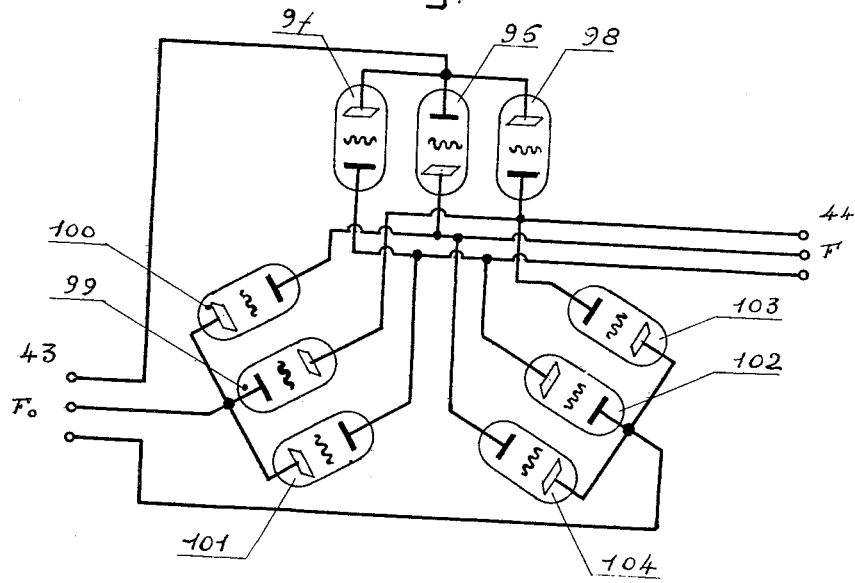

In the circuit shown in Figure 4, the first phase of the network at the fixed frequency $F_o$ (43), is connected to one of the phases of the output network at the variable frequency F (44), by means of a tube disposed in one direction, (tube 96), and it is connected to each one of the other phases of the network 44 by means respectively of two tubes 97 and 98 connected in a direction opposite to that of tube 96. The second phase of the network is also connected to one of the phases of the variable frequency network 44, by means of a tube 99, disposed in one direction, and respectively connected to the two other phases of the variable frequency network 44, by means of two further tubes in the opposite direction, 100 and 101. The third phase of the fixed frequency network (43), is likewise connected to one of the phases of the variable frequency network (44), by means of a tube 102 disposed in one direction and respectively to the two other phases of the variable frequency network, by means of two tubes in the opposite direction, 103 and 104.

The output waveform of the nine tube circuit is still not completely satisfactory. The device is greatly improved by the use of a twelve tube circuit instead of nine.

Figure 5:
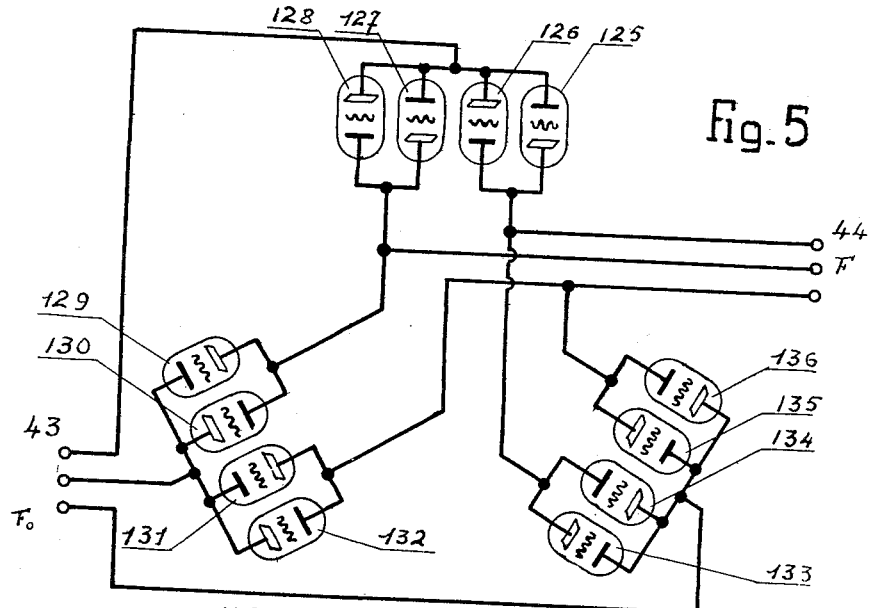

Accordingly, Figure 5 shows the scheme of such a twelve tube circuit: each phase of the distribution at fixed frequency $F_o$ (43), is connected, by means of two groups of reverse connected tubes, to two phases of the distribution at variable frequency F (44). Thus, the first phase at the frequency $F_o$ is connected with the tubes 125 and 126 to the first phase at the frequency F, and is connected by the tubes 127 and 128 to the second phase at the frequency F. Likewise, the second phase at the frequency $F_o$ is connected by the tubes 129 and 130 to the second phase at the frequency F, and by the tubes 131 and 132 to the third phase of the frequency F. Finally, the third phase at the frequency $F_o$ is connected by the tubes 133 and 134 to the first phase at the frequency F, and by the tubes 135 and 136 to the third phase at the frequency F.

Figure 6:
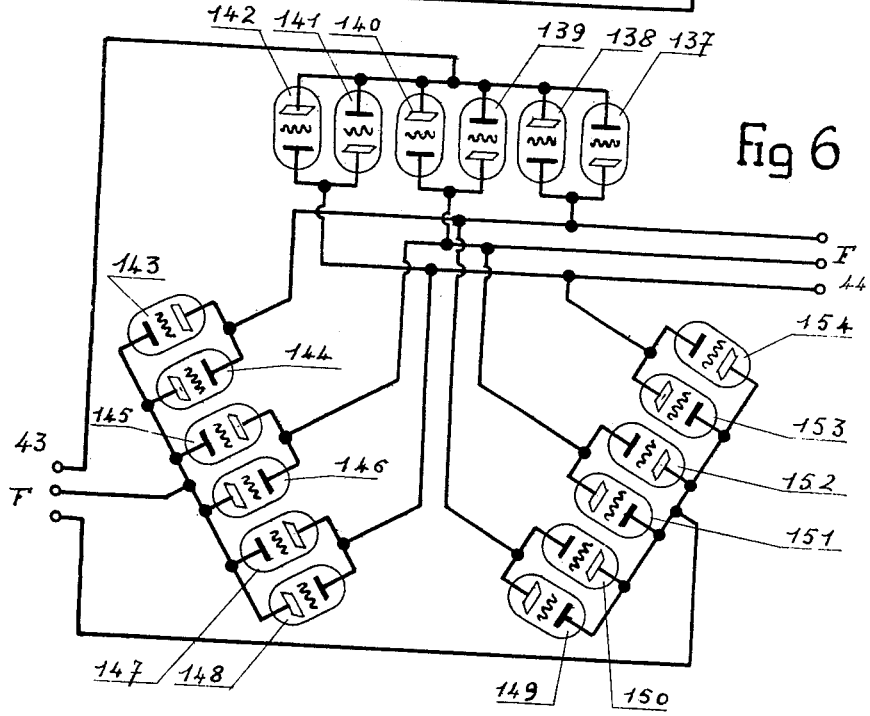

The form of the output current when twelve tubes are used, although much better than in the case of six or nine tubes, is still fairly irregular. The best result is obtained by using eighteen tubes, as shown in Figure 6. In this case, each phase of the network at constant frequency is respectively connected by three groups of two reversely connected tubes, to each phase of the variable frequency output network. The two tubes in opposition, 137, 138, connect the first phase at constant frequency $F_o$ to the first phase at variable frequency F. The two tubes in opposition connecting the first phase at constant frequency $F_o$ to the second phase at variable frequency F, are designated as 139, 140. The two tubes in opposition connecting the first phase at constant frequency $F_o$ to the third phase at varible frequency F, are designated as 141, 142. The two tubes in opposition connecting the second phase at constant frequency $F_o$ to the first phase at variable frequency F are designated as 143, 144. The two tubes in opposition connecting the second phase at constant frequency $F_o$ to the second phase at variable frequency F are designated as 145, 146. The two tubes in opposition connecting the second phase at constant frequency Fo to the third phase at variable frequency F, are designated as 147, 148. The two tubes in opposition connecting the third phase at constant frequency Fo to the first phase at variable frequency F, are designated as 149, 150. The two tubes in opposition connecting the third phase at constant frequency Fo to the second phase at variable frequency F, are designated as 151, 152. The two tubes in opposition connecting the third phase at constant frequency Fo to the third phase at variable frequency F are designated as 153, 154.

The form of the current waveform is, in this case, considerably improved over those of the previous systems. It is interesting to observe that, when we use heated cathodes, the eighteen cathodes can be fed by only six secondary independent windings on a transformer; such a circuit constitutes an important simplification.

Figure 8 discloses a system for effecting the motor speed control of an asynchronous motor in accordance with the above described concepts. A motor 80, which is preferably of an asynchronous variable speed type, has its field controlled by a motor field switching network 81 through the medium of switches 40, 41 and 42. The field of the motor 80 preferably takes the form of field portions 11 through 16, 21 through 26 and 31 through 36, as is shown in Figure 1, and the motor field switching network 81 is of the form shown in the said Figure 1. The several control coils 18, 19, 28, 29 and 38, 39, are selectively energized through the switches 40, 41 and 42 from the output of a frequency changer 82, the input of which frequency changer is supplied from a source of constant frequency (Fo). The frequency changer is in turn controlled from a source of control frequency 83 and the said frequency changer 82 may take any of the forms shown in Figures 3 through 6 inclusive. Depending upon the precise control frequency input from source 83, the output of frequency changer 82 will vary in frequency, as discussed previously, and for the several output frequencies available from frequency changer 82, switches 40, 41 and 42 are so positioned that the field of motor 80 assumes the appropriate impedance, as discussed in reference to Figure 2. As a result of this system, I obtain a speed control of motor 80 through the variation of input frequency thereto; and I further control the effective impedance of the motor 80 for the several applied frequencies by the switching network 81.

What I claim and desire to secure by Letters Patent of the United States is:

1. Apparatus for controlling the speed of a variable speed electric motor, said motor including a plurality of separate windings each having similar characteristics, comprising a source of variable frequency constant amplitude voltage coupled to said windings, and switching means for selectively varying the interconnection of said windings with changes in the frequency of said source.

2. Apparatus for controlling the speed of a variable speed electric motor, said motor including a stator having a plurality of separate windings having similar electrical characteristics, comprising a supply circuit of alternating current, control means coupled to said supply circuit and varying the frequency of output therefrom, means coupling the variable frequency output from said supply circuit to said plurality of windings, and means for selectively coupling said separate windings in series, in parallel, and in series-parallel, as the frequency output of said supply circuit changes.

3. The apparatus of claim 2 in which said control means comprises a gas-tube frequency converter.

4. The apparatus of claim 2 in which said means coupling said separate windings in series, in parallel, or in series parallel comprises a plurality of switches coupled respectively to each of said windings, said windings being respectively interconnected in series for low speed operation, in series-parallel for intermediate speed operation, and in parallel for high speed operation.

5. Apparatus for controlling the speed, torque, and power of a polyphase electric motor having a plurality of separate windings, and the intensity of current supplied thereto from a constant amplitude voltage source of supply, comprising a polyphase source of alternating current supply, means coupling each of the phases of said source to the phase windings of said motor, means varying the frequency of output of said source, and means for selectively varying the interconnection of the phase windings of said motor to vary the transformation ratio of said windings as the frequency of said source varies.

6. The apparatus of claim 5 in which said means varying the frequency of said source comprises a gas tube circuit interposed between said source and said windings, and control means varying the cadency of firing of the tubes of said circuit to vary the frequency output therefrom.

7. The apparatus of claim 6 in which said means varying the interconnection of said windings comprises a remote controlled commutator device, said commutator device selectively connecting said windings in series, in parallel, and in series-parallel.

8. The apparatus of claim 7 in which said control means includes means suppressing the current output from said gas tube circuit when said commutator device is about to change the interconnection of said windings, and reestablishing the output from said gas tube circuit after a new interconnection of the windings has been effected.

9. The apparatus of claim 5 in which said means varying the frequency of said source comprises a circuit having grid controlled gas tubes disposed between each phase of said source and said motor windings, and control means coupled to the grids of said tubes for varying the firing thereof in response to a desired frequency output.

10. The apparatus of claim 9 in which said control means comprises a variable frequency oscillator.

11. The apparatus of claim 5 in which said means varying the frequency of said source comprises a circuit having grid controlled gas tubes disposed between the phases of said source and the phases of said motor, and control means coupled to the grids of said tubes for varying the firing thereof in response to a desired frequency output.

12. The apparatus of claim 11 in which said circuit includes a group of at least two reverse connected gas tubes coupled to each of the phases of said source.

13. The apparatus of claim 12 in which said control means comprises a mechanical switching device driven by a small auxiliary motor.

No references cited.

July 19, 1955
A. A. VARELA ET AL
2,713,658
POWER SUPPLY FILTER NETWORK
Filed Nov. 26, 1946
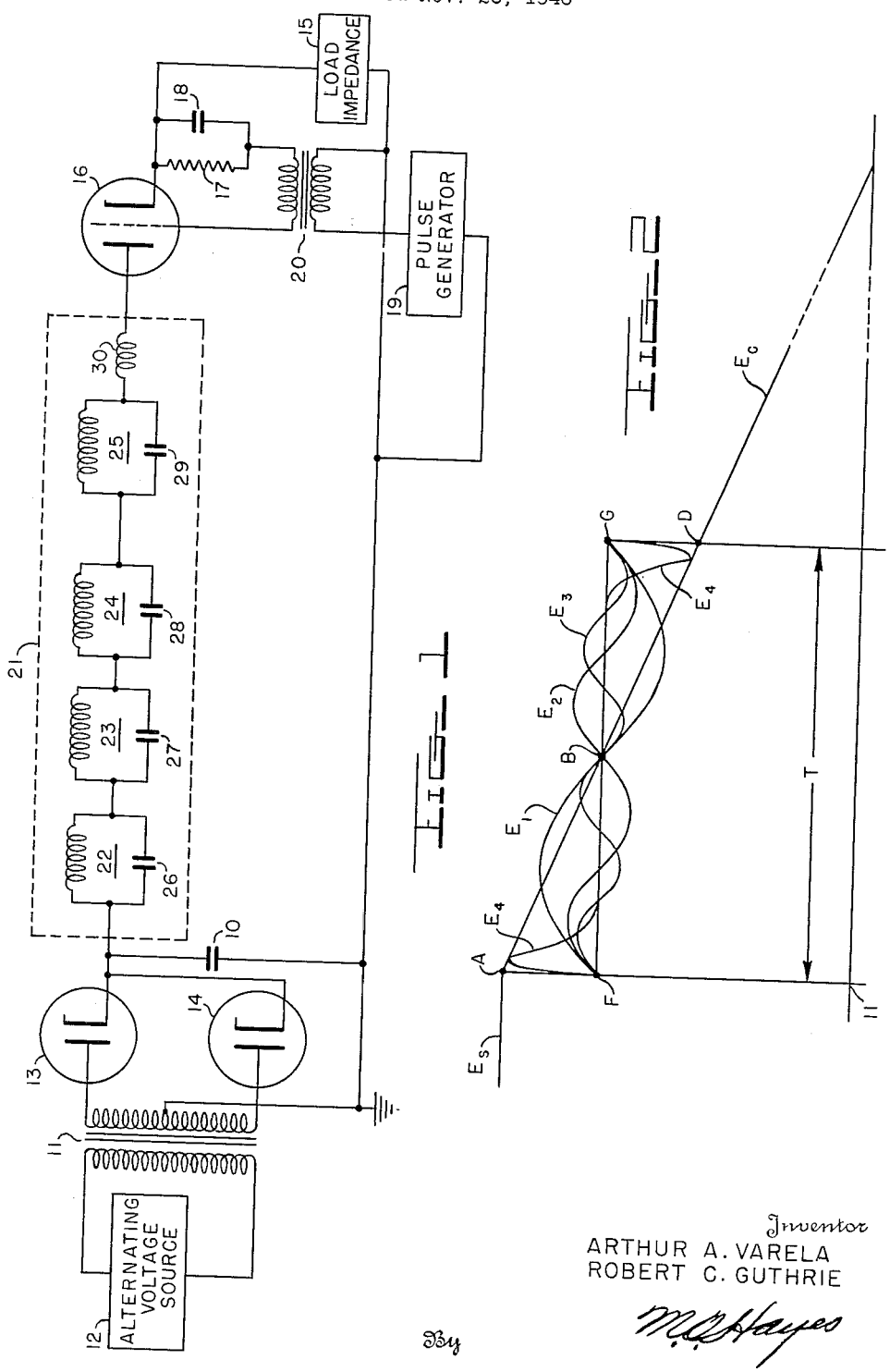
Inventor
ARTHUR A. VARELA
ROBERT C. GUTHRIE
By M.C.Hayes
Attorney